United States Patent [19]

Harris

[11] 3,777,222

[45] Dec. 4, 1973

[54] MODULAR TOUCH SENSITIVE INDICATING PANELS WITH TOUCH AND LIGHT TRANSMISSIVE OVERLAY COVER MEMBRANE CONTAINING VISIBLE PRINTED INDICIA

[75] Inventor: Thomas J. Harris, Poughkeepsie, N.Y.

[73] Assignee: International Business Machines Corporation, Armonk, N.Y.

[22] Filed: May 12, 1972

[21] Appl. No.: 252,822

[52] U.S. Cl. .................... 317/112, 200/5 R, 200/46, 235/145 R, 340/365 S

[51] Int. Cl. .......................... H02b 1/04, G06c 7/02

[58] Field of Search ................ 340/365 S; 179/90 K; 235/145 R; 307/116; 200/1 R, 1 SA, 1 SE, 46, 159 B, 167 A; 317/101 CB, 101 CE, 112

[56] References Cited

UNITED STATES PATENTS

| | | | |
|---|---|---|---|
| 3,495,232 | 2/1970 | Wagner | 340/336 |
| 3,290,439 | 12/1966 | Willcox | 200/5 A |
| 3,591,749 | 7/1971 | Comstock | 200/159 B |
| 3,120,584 | 2/1964 | Grunfelder | 200/5 E |

*Primary Examiner*—Robert K. Schaefer
*Assistant Examiner*—Gerald P. Tolin
*Attorney*—W. N. Barrett, Jr. et al.

[57] ABSTRACT

Presently described touch sensitive indicating panels have thin but durably constructed plastic overlay membranes serving to: (a) transmit touch actuation pressure to underlying elastic diaphragm switch contacts arrayed at selected points of a predimensioned grid; (b) transmit rear projection light indications received through spaces between switch grid conductors from suitably positioned light sources; (c) transmit alphanumeric light indications from suitably located arrays of light sources; (d) allow viewing of fixed information behind panels through suitably located areas; (e) display permanent indicia of artwork and nomenclature designating touch sensing and rear projection sites and functions; and (f) complete a housing enclosure. Panels for various host systems (e.g. computers, peripheral terminals, etc.) are assembled in various shapes and function types from a limited inventory of modular touch switches and control circuits. In the switch modules crossed grids of spaced conductors, which are pre-fabricated on transparent flexible support films, have pairs of spaced parallel contact segments subject to flexure into contact at positions offset from the grid intersections. The grids have predetermined dimensions of intersection spacing and the offset contact pairs have specific design features for enhanced integrity and reliability of contact operation. Modular sensing circuits perform the functions of: scanning contacts of the panel switch modules for touch closure conditions; representing locations of closure conditions at predetermined locations; providing audible feedback (beep tone) of contact sensing, and translating sensed contact conditions into panel light indications and/or electrical control functions. Various arrangements are described for producing complex control and indicating effects based upon combinational sensing of particular contact sequences.

36 Claims, 20 Drawing Figures

MODULAR TOUCH SENSITIVE INDICATING PANELS WITH TOUCH AND LIGHT TRANSMISSIVE OVERLAY COVER MEMBRANE CONTAINING VISIBLE PRINTED INDICIA

BRIEF SUMMARY OF THE INVENTION

Much has been written of late concerning construction of indicating panel systems which provide interactive touch sensing, indicating and control effects relative to an essentially continuous indicating surface and an associated host device or system. Systems of this type are characterized generally by flat streamlined appearance, economy of design and convenient accessibility of parts for replacement or repair.

Typical panels of this type suitable for mass production and economical maintenance are primitive pushbutton/back-illuminated affairs. More sophisticated systems are usually custom designed to provide desired sensing, indicating and control functions. Thus, the complex control and indicating panel of a host computer ordinarily would not be designed for mass production and its field replacement parts would not be interchangeable with those of a control and indicating panel associated with host teleprocessor terminal equipment or the like.

The present invention seeks through a modular approach, and with component mocules of improved but sophisticated design, to provide for mass fabrication and economical field maintenance of touch sensitive indicating panels. Panels as presently contemplated are characterized by reduced cost of manufacture and maintenance, ruggedness, simplicity and modularity of construction, reliability of operation and adaptiveness to assembly in a variety of different size configurations having distinct touch sensing, indicating and control functions. Present panels are organized to provide complex control effects based upon sensing and reaction to predetermined contact sequences.

Features of the present invention include:

1. Utilization of dimensionally standardized semi-transparent modules of elastic diaphragm type switches formed out of grid arrays of printed circuit conductors retained on transparent elastic support films. The support films are separated by a spacing film having voids at contact sites. These voids are offset from the grid intersections of the conductors. The conductors have correspondingly offset elastic segments paired at the contact sites. The paired segments are configured to be subject to flexed engagement over a substantial area to provide enhanced contact integrity. Paired contact segments are electrically shunted by redundant conductive segments which bypass the spacing voids and enhance contact reliability. Effects of a break in a contact segment are circumvented by the alternate signal conduction paths presented by the rendundant segment.

2. The covering surface of the panel, a membranous touch transmissive overlay member (gloss treated to reduce specular reflection), features protectively encapsulated customized artwork of opaque character surrounding transparent window-like areas of transparent appearance corresponding to indication sites of first and second types: (a) Type 1 — binary (on-off); (b) Type 2— Symbolic (alphanumeric). Binary indicating sites are backed by rear surface coatings for rear projection screen effects by which binary spot illumination within the panel is broadened into rear projected illumination appearing to cover an area larger than the spot. Type 2 sites do not have rear projection screen coatings; they are used for direct viewing of multi-spot character image indications. Overlays may be dimensioned to span plural switch modules, and associated panel systems may be assembled as "aggregates" of switch modules combined with touch sensing and control modules.

3. In a preferred embodiment disclosed herein indications are produced by microminiature light emitting diode (LED) point sources which produce light in a particular limited portion of the visible spectrum (for instance red light). The overlay contains or is laminarly associated with a discrete filtering layer which is arranged to exclusively pass light in this portion of the spectrum and thereby attenuate extraneous light of broader spectral content (i.e. white background light).

4. The indicating sites and touch sensitive sites of the panel are clearly delineated, both as to location and function, by the permanent artwork of the overlay.

5. In some applications there are areas on the panel which do not have a filtering layer to allow direct viewing of fixed information located behind the panel.

6. In the preferred arrangement, a stress easing film of touch transmissive transparent sheet material is disposed between the basic switch module and overlay. Voids in this added layer are so placed, in relation to voids in the spacing layer of the switch through which touch contacts are completed, as to ease the stresses exerted upon the paired offset contact segments of the switch module at edges of the spacing layer voids while coincidentally presenting tolerably low physical impedance to transmission of touch pressure to the contact segments.

7. The basic switch modules are preferably prefabricated to include integral flexible cabling extensions (tails) of the conductors and their supporting films. These extensions are dimensioned to connect with terminals of a printed circuit module mounted directly behind the respective switch module. The printed circuit module is used to carry the electrical signals requisite to touch sensing, to retain the indicating lights and to carry the signals controlling indication. With the above tails bussing connections between the switch module and the backing printed circuits need be made only at the printed circuit module and not at the switch module. This reduces the cost of fabrication of the switch modules/tail combination as well as the cost of panel assembly and/or repair.

8. The backing printed circuit modules may contain the active logic circuits for touch sensing, indication control and host interfacing. Alternatively, the backing module may be configured simply as a passive connector between the switch module contacts and touch sensing circuits on the one hand and between the indicating lights and their control circuits on the other hand.

9. The host system circuits may be housed adjacent the panel circuits, preferably with an intervening shield to reduce crosstalk between host and panel circuits.

10. The panel circuits may be interconnected with communication media, through the host system or otherwise, to provide for remote touch sensing and remote origination of indications and panel control signals.

11. The touch sensing circuits of the panel are organized to simulate various switching effects corresponding to operations of mechanical push buttons, latching toggles, rotary selection switches, alphanumeric keyboards, etc. A feature of the invention resides in the sequential-combinational association of certain groups of touch sensitive panel sites and corresponding contacts as complex switching and control units with extensive sharing of a particular group (e.g. a group constituting an alphanumeric selection keyboard).

12. Other features of the panel electronics include provision of circuits capable of exercising bypass or supervisory control over particular touch combination sensing circuits, whereby associated touch combinations may be induced by a single control signal (remote or other). Thus, the panel may be set to various composite indicating conditions which would normally involve extensive touch manipulation (e.g. for test sequencing, system reset, etc.).

13. One panel touch sensitive site, designated "PANEL ON-OFF" or "ENABLE-DISABLE" controls distribution of sensing signals relative to all other touch site contacts. This permits disablement of panel touch sensitivity without destruction of indications as in a full power on-off.

14. The backing printed circuits and associated LSI logic circuits are easily adapted to provide complex touch sensing and indicating effects. For instance, in a described embodiment of a panel associated with a host processor system certain logic circuits are conditioned to respond exclusively to sensing of dual contact operations occurring in specific sequence at specific panel contact sites of a first "keyboard" set and a second "toggle" set, and to produce as response a light spot indication on the panel of an image of character intelligence touch selected in the keyboard set and an electrically stored signal representation of a digital code form of the same intelligence. In another operation, a group of binary code light indications in one area of the panel are translated into character image indications in another area of the panel.

15. Special clocking circuits prevent erroneous or ambiguous touch sensing effects such as contact bounce, double contact operation, etc. Sensed touch contact conditions give rise to clocking functions serving to block sensing of more than one contact position and to inhibit further sensing of other contacts until contact at the sensed position is broken.

16. An audible tone generator (beeper) is turned on with sensing of a closed contact and remains on until the contact is released.

17. A valid address (VA) clock pulse is initiated upon sensing contact engagement at particular contact positions associated with foregoing dual touch keyboard-toggle operation. If the second touching operation of a dual touch sequence is not performed within the predetermined duration of the VA pulse, the indicating function associated with the dual touch is inhibited and effects of the first touch are cancelled. Thus, inadvertent or mischievous destruction of existing alphanumeric indications would be minimized.

18. Since the touch switching points of the switch modules extend virtually across the entire area of overlay available for indication, it is necessary to provide standoff spacing structures between the lights (LED's) and basic switch modules to protectively shelter and space the lights relative to the switch modules. This is accomplished preferably by means of a molded plastic grid frame support structure housing the lights. A stiffener layer of transparent plastic sheeting may be interposed between this support structure and the switch modules to provide touch backing support for the switches over voids in spacing structure.

19. In view of the contemplated extensive touch handling, the overlay is required to have composition, construction and artwork of a suitable and compatible character.

20. Because of the modularity of the system active switches can easily be added to or deleted from a panel during the design phase of the associated host system.

The foregoing and other features, objects and distinguishing aspects of the present invention may be more fully appreciated upon consideration of the following detailed description.

DETAILED DESCRIPTION

TABLE OF CONTENTS

Introduction
Overlay
Elastic Diaphragm Switch Module (EDS), Stiffener and Grid Frame
Touch Sensing And Indication Controls (General)
Touch Sensing Circuits Indication and Host Input Control
Plural Touch Interactive Operations
a. Hex code indications translate to graphic symbol indications;
b. Hex code key selections translate to graphic symbol indications;
c. Alphanumeric indication field definition;
d. Combination effects (touch position, time, etc.).
Miscellaneous Functions
Conclusion

INTRODUCTION

Referring to FIGS. 1–5 and 9, present panel systems comprise a touch transmissive elastic overlay membrane 1 forming a covering surface of the panel with discrete sites designated by integral artwork reserved for touch response and light indication. Behind and parallel to the overlay membrane, one or more contact grid modules 3 (FIG. 5) of paired elastic conductive elements 4*a*, 4*b* provide touch flexible switching contacts at discrete coordinates of a predetermined grid. Contact grid modules such as 3 are separated from the overlay 1 by a transparent and elastic membrane 5 the function of which is to ease touch stresses imposed upon the normally separated contact pairs 4*a*, 4*b*. The contact pairs 4*a*, 4*b* are actuable into engagement by manual touch forces transmitted through the overlay and stress easing membranes. Individual contact pairs are registered with centers of respective touch sensing sites such as 6 (FIG. 4) on the overlay, the latter distinguished by permanent nomenclature and outlining artwork of the overlay.

Figure 1:
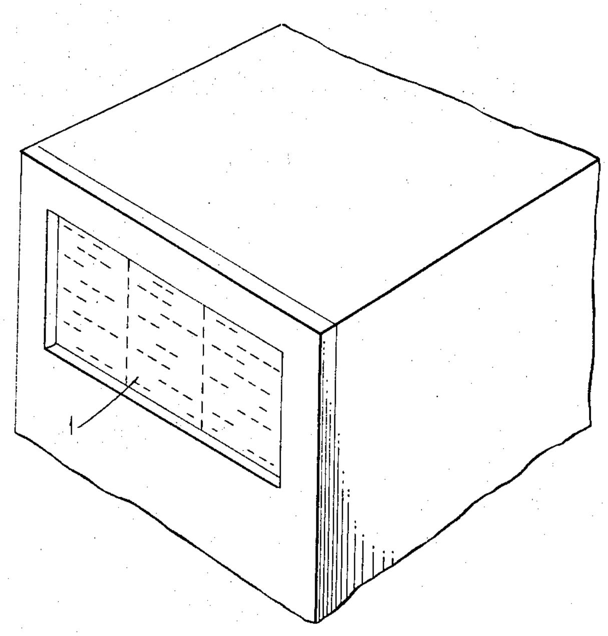
FIGS. 1 and 2 provide perspective views of two different touch sensitive indicating panel configurations assembled in accordance with the teaching of the present invention within integral housing frames of respective host equipment.
Figure 2:
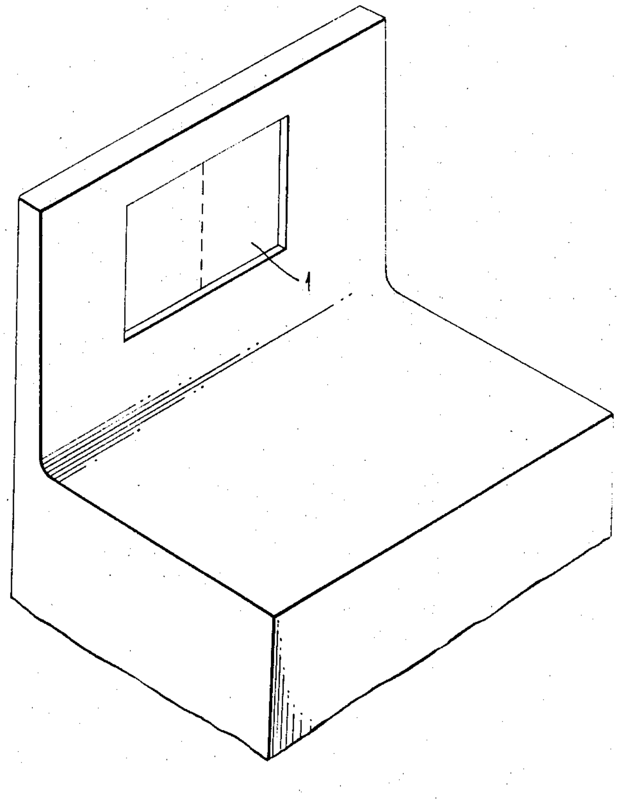
Figure 3:
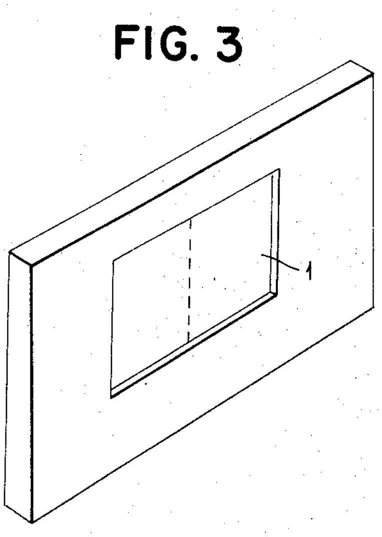
FIG. 3 represents a perspective view of a self-contained portable/pluggable panel assembly in accordance with the present invention designed for plug-in attachment to a host assembly.
Figures 4, 4A:
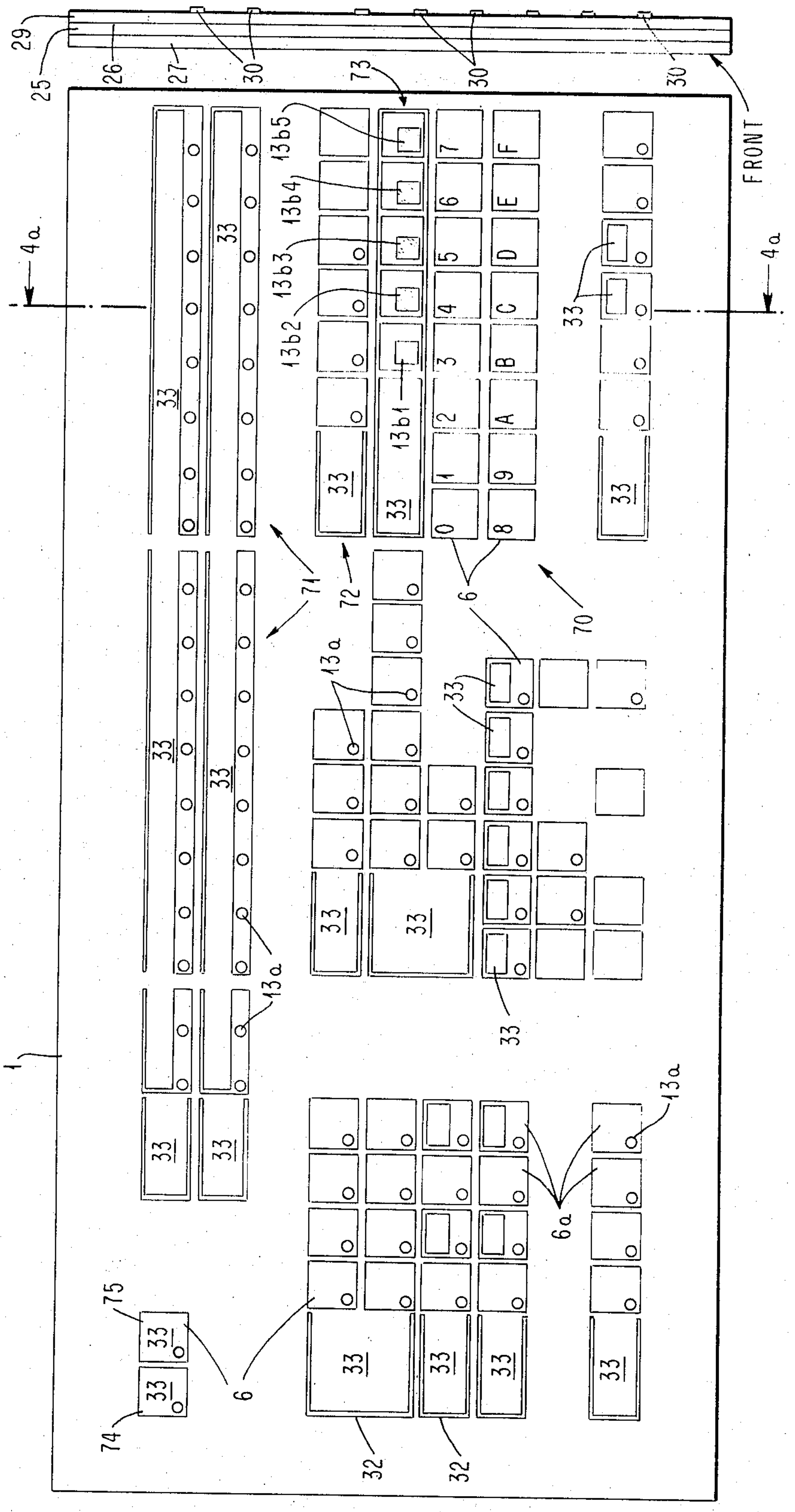
FIGS. 4 and 4a provide elevational and sectional views of an overlay membrane in accordance with the invention illustrating exemplary artwork, nomenclature and rear coating features.

Printed circuit module 7 (FIG. 5) mounted behind the switch module is separated from the latter by grid frame 9 and transparent stiffener layer 11. Module 7 contains sockets 12*a*, 12*b* (FIG. 9) for retaining respective light emitting diode units 13*a*, 13*b* in registration with respective indicating sites of the overlay which are also designated 13*a*, 13*b* (FIG. 4). Diode units such as 13*a*, 13*b* are sheltered and housed in respective compartments 14*a*, 14*b* of the grid frame (FIG. 9) and are isolated from touch forces transmitted to the switch module by the stiffener layer 11. Tapered shoulders 15*a* in cells 14*a* provide tolerance positional adjustments for lights 13*a*.

Figure 9:
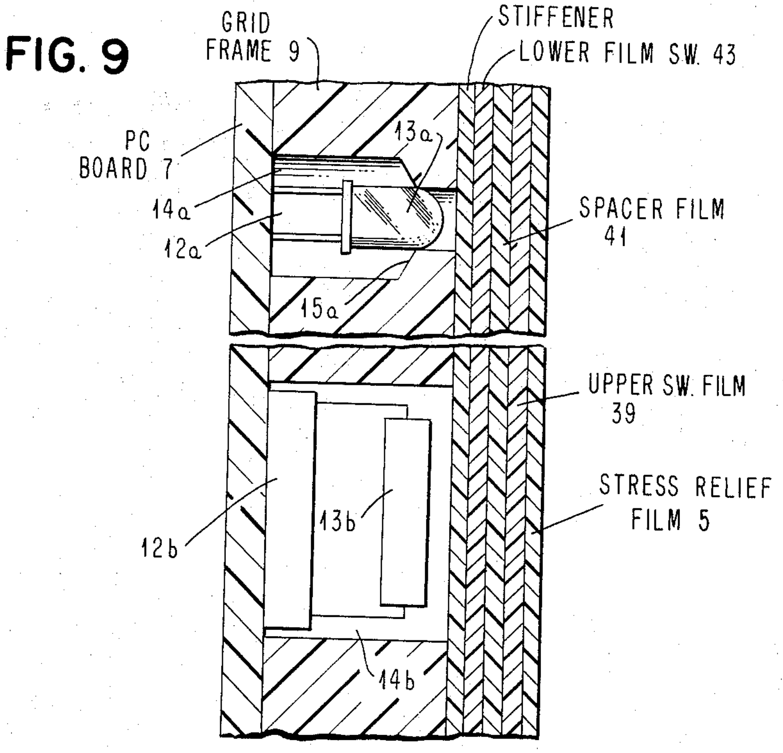
FIG. 9 provides a section view of single spot and multi-spot light emitting diode units positioned in indicating compartments of the grid-frame structure.
Figure 9A:
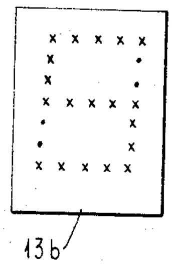
FIG. 9*a* provides an elevational view of the multi-spot diode unit for character symbol image indication excited to indicate the numeral "8"

The diode packages are of two basic types: single diodes 13a for producing discrete on-off and/or binary digit indications at small area indicating sites 13*a* (FIG. 4) and plural diodes 13*b* energizable in selective groupings to provide graphically intelligible alphanumeric indications at larger area indicating sites 13*b* (FIGS. 4, 9*a*).

The on-off (or binary) indicating sites 13*a* of the overlay (FIG. 4) are circular "islands" of transparency in the predominantly opaque background artwork of the overlay. The alphanumeric indicating sites 13*b* are rectangular "islands" of transparency in the same opaque background. The touch sensitive sites 6 are outlined as "keys" by rectangular artwork contrast.

Printed circuit module 7 (FIGS. 5, 9) connects with contact conductors 4 of the switch module 3 through integral tail-like cabling extensions 21 (FIGS. 5, 5*a*) of the conductors and their flexible retaining support layers as described more fully hereafter.

Light emitted from diode indicators 13*a*, 13*b* is transmitted for viewing (FIGS. 4, 5) through the stiffener layer, switch support layers, switch spacer layer, stress relief layer and overlay "window" (indicating sites 13*a* or 13*b*).

An electromagnetic shield layer 23 (FIG. 5) may be interposed between the printed circuit module 7 and not shown circuit components of the host system to prevent noise crosstalk between the two systems.

If desired, a mesh of fine wire may be provided over or in the overlay element to provide similar front shielding effects.

Foam backing layer 24 (FIG. 5) adds mechanical touch support and stability to the assembly, and insulation between PC board 7 and noise shield 23.

OVERLAY

Specifics of the overlay membrane 1 are indicated in FIGS. 4 and 4*a*. The overlay membrane is comprised of a central layer 25 of polyvinyl chloride (PVC) homopolymer. Silk screened artwork is applied to the surfaces of the PVC layers. Typically central layer 25 is formed of a laminate of two PVC layers. The screened ink is applied to the inner surfaces of the two PVC layers. Central layer 25 is laminated between a front covering film 27 of clear polyester and a rear plastic film 29 of red polyester. Rear layer 29 serves as a filter which is selectively transmissive to red light emitted by the above mentioned diodes for reasons which will become clear as the description proceeds.

Since the overlay must be touch transmissive, the thickness and uniformity of the composite are fairly critical. A suitable central layer thickness would be $0.010 \pm 0.002$ inches. Suitable front and rear polyester layer thicknesses would be $0.001 \pm 0.0002$ inches each. Thus, the composite overlay thickness may be $0.012 \pm 0.0024$ inches.

Front layer 27 should be gloss treated to reduce specular reflection. A gloss characteristic of $65 \pm 5$ units or lower is deemed suitable.

Figure 10:
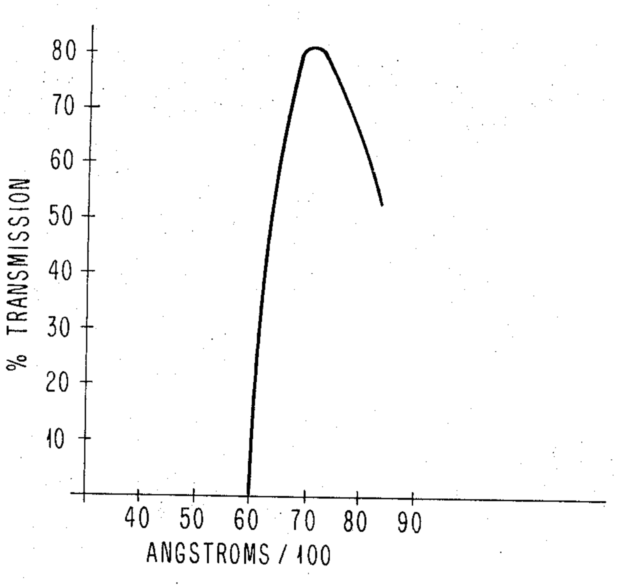
FIG. 10 is a graph indicating a light filtering characteristic of the overlay membrane.

Rear layer 29 should have a "red" filtering characteristic as shown in FIG. 10, with a minimum transmission of 75 percent at 7000A. At sites 13*a* of binary indication the rear surface is coated with rear projection screen coatings 30 characterized by minimum transmitted gain of 100 percent as compared to a matte white reflective surface. The red film 29 should be bonded to the PVC substrate by conventional bonding procedures. If desired, openings may be provided in the red film at selected sites and these sites may be reserved for adhesion of removable labels carrying viewable printed nomenclature.

The overlay may be secured to the panel housing structure by double sided pressure sensitive adhesive tape (3M adhesive No. 465 or equivalent) or by mechanical clamping techniques.

The purpose of the red layer 29 is to selectively transmit for viewing red light emitted by the light emitting diode units 13a while filtering extraneous light such as might arise from internal reflection of light originated by background light illumination sources in front of the panel. With the red filter layer the rejection of such "noise" is sufficient to assure adequate contrast.

The artwork covering all but the indicating sites of the overlay is opaque and distinctive. The indicating sites are transparent to red light. The touch sensitive "key" sites 6 (FIG. 4) are indicated by rectangular artwork patterns colored to contrast distinctly with the predominant background color (e.g. rectangles of gray, red, green, blue, etc. in a black background) and are designated functionally by contrasting printed nomenclature (e.g. opaque white print). Back-lit touch sites such as 6*a* (FIG. 4) contain respective indicating sites such as 13*a* at which "back-lighting" illumination is provided. Groups of keys operated as a set (e.g. a rotary switch) are outlined (FIG. 4) by contrast lines such as 32 (e.g. gray lines in black background) and by group nomenclature 33 (e.g. "FUNCTION SELECT", "DISPLAY SELECT", . . . ).

SWITCH MODULE, STIFFENER, GRID FRAME ASSEMBLY

Figures 5, 5A:
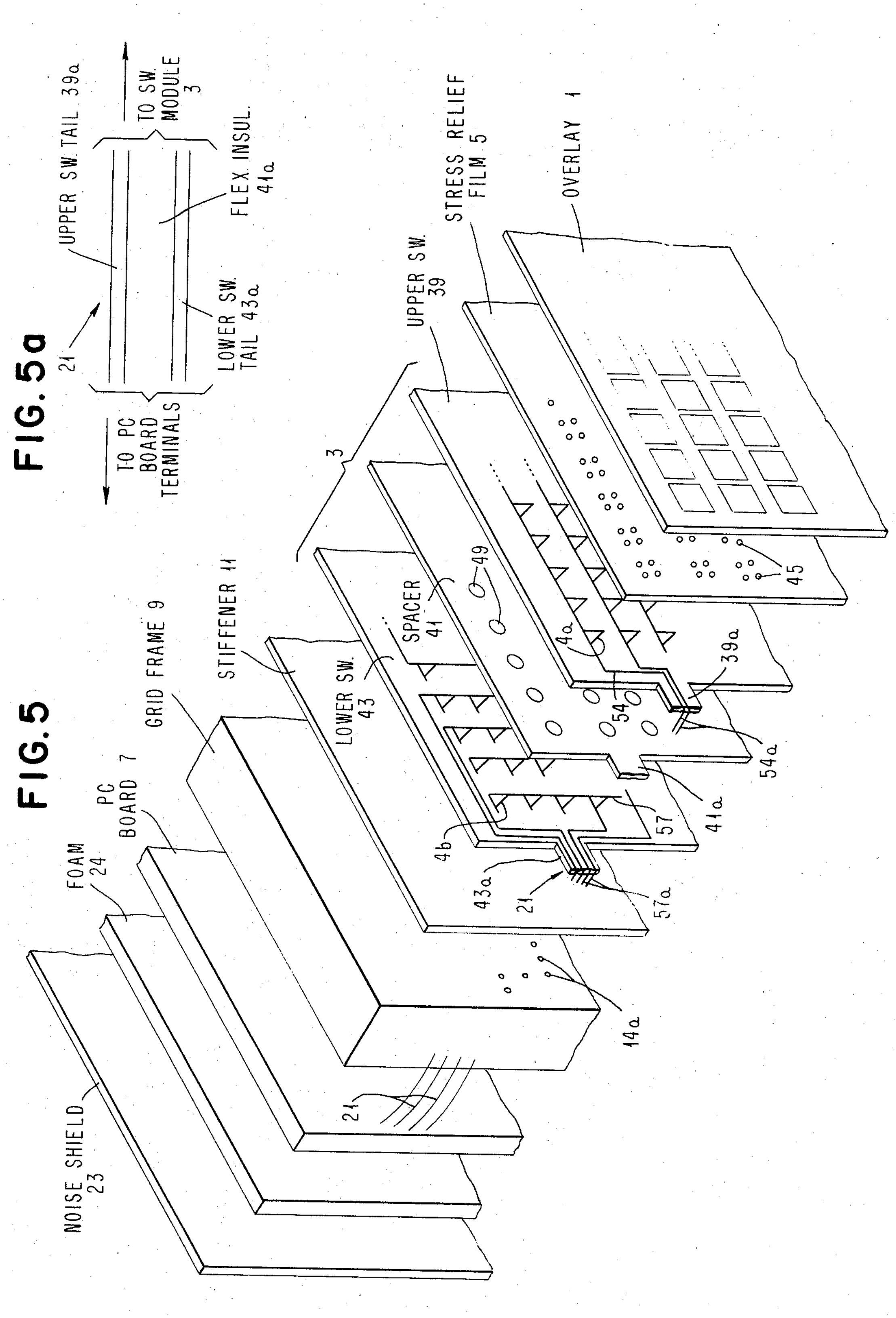
FIG. 5 provides an exploded perspective view of the basic panel constituents.
FIG. 5*a* illustrates the flexible cabling extension of the switch module.
Figure 6:
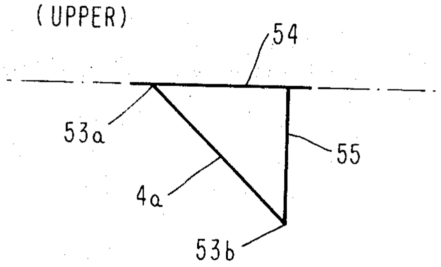
FIGS. 6 and 7 show geometric details of paired touch-engageable offset contact segments of the upper and lower sheet sections of the switch module.
Figure 7:
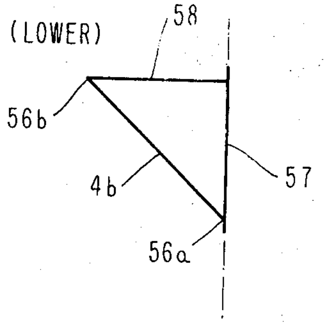
Figure 8:
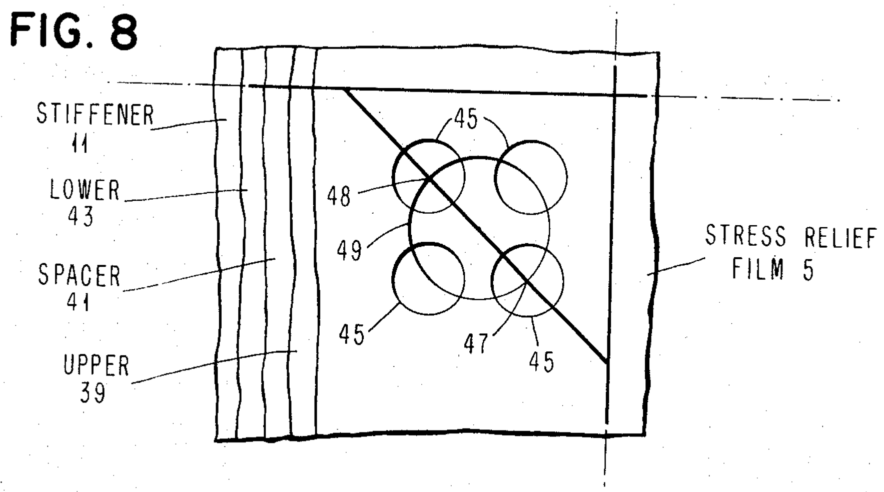
FIG. 8 provides a plan "peel-away" view of the contact segment pair of FIGS. 6 and 7 and associated stress easing and backing elements.

The elastic diaphragm switch (EDS) module 3 (FIGS. 5–9) comprises, in successive layers (from front to rear), an upper (horizontal conductor) support film 39, a spacer layer 41 and a lower (vertical conductor) support film 43. These are fronted by stress relief layer 5 and backed by stiffener layer 11. Relief layer 5 contains groups of four voids 45 (FIGS. 5, 8). Two of the voids in each group are aligned with edges 47,48 of touch site aligned voids 49 in spacer layer 41. These edges represent points of potential shearing stress between touch-engageable contact segment pairs 4*a*, 4*b* on respective support films 39,43 and the intervening spacer layer. The other pair of voids in each stress relief group 45 serves to reduce the touch transmission "impedance" of the stress layer at respective touch site 6 associated with respective spacer void 49.

A particular advantageous feature of the present switch array is the indicated offset parallel configuration of the paired contact segments 4*a*, 4*b* which are aligned with touch sensitive panel sites. Both ends 53*a*, 53*b* (FIG. 6) of segment 4*a* connect to a main horizontal conductor 54; end 53*b* connecting via extension segment 55. Similarly ends 56*a*, 56*b* of segment 4*b* (FIG. 7) connect to main vertical conductor 57; 56*b* via extension segment 58. Upon flexure upper segment 4*a* moves thru respective void 49 and contacts lower segment 46 thereby effecting connection between main conductors 54 and 57. As the contact segments 4*a*, 4*b* are parallel the contact engagement area is broader than it would be for crossed lines. Furthermore, since the contact segments connect at both ends to the respective main conductors 54,57 from which they depend, a break in a contact segment at either edge 47,48 (FIG. 8) of the spacer void 49 would not affect the ability to complete connection through the broken segement between conductors 54 and 57, and therefore would not prevent touch sensing usage of the affected site.

It would be noted that the horizontal and vertical main conductors do not transverse the spacing layer voids 49, However, they may be situated close to these voids and to their branched contact segments, and thereby provide maximal indication space or at least minimize obstructive interference between indicating and touch sensing elements.

Another feature of the switch module is the integral flexible cabling extension 21 (FIGS. 5, 5*a*). Main conductors such as 54,57 and their respective upper and lower support films have integral extensions [54*a*/39*a*, 57*a*/43*a*] forming a flexible bus. Flexible insulator 41a may be either an integral extension of spacer layer 41 or a separately formed insulating adhesive film providing isolation and coherence for the bus elements. The length of bus 21 is sufficient to make connections to not shown terminals on printed circuit module 7.

In operation, scan signals are supplied sequentially to the main switch conductors in one layer (e.g. the horizontal conductors 54 — upper layer), and sensed in combination with the cable extensions of the main conductors — lower layer. Sensing is accomplished by clock conditioned sensing circuits on (or connecting with) printed circuit board 7. These circuits (FIGS. 11–16) detect coupling of the scan signal through active panel contacts (the meaing of active will become clear as the description proceeds).

Designation of active contact pairs may be achieved either mechanically (e.g. by jumper wires or by programmed fabrication of spacer layer voids 49 only at selected points of the contact grid), or electrically by providing appropriate electrical control signals to the sensing logic.

It is also optional whether contact segment pairs are provided at every available contact coordinate of the grid or only at selected (active) coordinates. Compositional and dimensional details of a preferred embodiment of switch module and cable extension are:

a. Support layers 39/39*a*, 43/43*a*: polyethylene terephthalate ("Mylar") flat films; thickness 0.002 inches ± 10 percent; cut-out to form main support and cable configuration.

b. Spacer layer 41: Mylar[R], Lexan[R], Melinex[R], or Celenar[R] film; thickness 0.004–0.008 inches. Voids 49 spaced on grid of ¾ – 1 inch centers. Diameter of voids 49 (variable from module to module but constant within module): ¼ – 5/16 inch.

c. Spacer extension 41*a*: simply an extension of 41 or if not flexible enough, an adhesive tape may be used in place of 41.

d. Conductor metallurgy (conductors 4*a*, 54, 54*a*, 4*b*, 57, 57*a*): gold plated copper; segments 4*a*, 4*b* are 0.060 inches wide and of thickness suitable for flexed contact application (e.g. 0.0013 inches).

e. Stress-relief film 5: Mylar[R] or Lexan[R]; 0.010 ± 0.001 inch thickness; voids 45: ⅛ inch diameters of locations determined by positions of spacer voids 49.

f. Construction: The elastomeric switch assembly construction is generally in accordance with the teachings of U. S. Pat. No. 3,308,253 to M. Krakinowski filed Mar. 25, 1965; issued Mar. 7, 1967.

TOUCH SENSING AND INDICATION CONTROLS - GENERAL

The touch sensing, control and indicating functions of the subject panel range from simple pushbutton and toggle effects to complex interactive effects interrelating operations of plural contacts in combinations (e.g. a contact of "alphanumeric keyboard" group and a contact of a function selection group).

Typically, referring to FIG. 4, varied overlay nomenclature 33 and outlining artwork such as 32 designate groups of interrelated touch contact sites and/or groups of interrelated indicator sites.

Sixteen contacts at 70 although not distinguished by nomenclature are nevertheless inter-related as a hexadecimal keyboard selection group (Hex Group). This Hex Group is usually sensed in combination with contacts of other designated groups. The contacts of the Hex group are distinguished only by associated "key" symbols (0,1, . . . 9,A,B, . . . ,F) in the overlay artwork. In one combinational sensing operation binary code indications at sites 71 are translated into corresponding hexadecimal character image indications at sites 13*b* by selected operations of contacts 72. In another combinational sensing operation hexadecimal information selected by operation of a contact in keyboard group 70 is translated into corresponding symbol indications at sites 13*b* determined by pre-operation of a contact in group 72.

In yet another complex operation, the aggregate panel indication at sites 13*a*, 13*b* is pre-conditioned by a simulation operation bypassing the normal touch sensing logic.

In still another complex operation, a panel on-off "toggle" contact 74 (on which artwork nomenclature 33 typically reads "PANEL ON/OFF") inhibits sense sampling of other panel contacts 6 while in "OFF" condition; circuits associated with contact 74 blocking distribution of a sense sampling clock to sensing circuits associated with other contacts. With contact 74 in "OFF"]condition, indications remain fixed and panel touch sensing functions other than sensing of contact 74 are disabled.

Another panel contact designated POWER ON/OFF controls indication as well as touch sensing by controlling power distribution to all panel circuits.

Touch Sensing Circuits (FIGS. 11–13,15)

Figure 11:
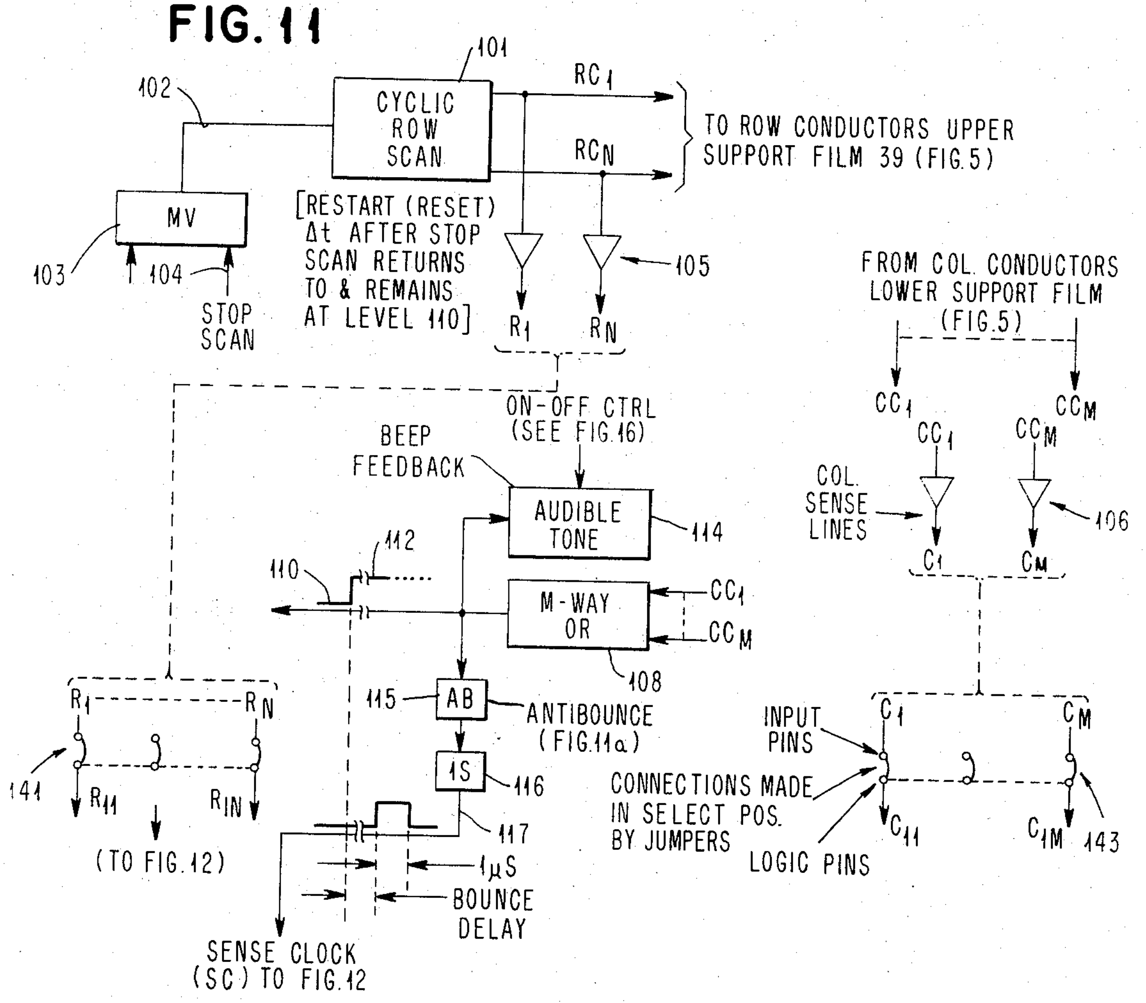
FIGS. 11 and 12 combined represent a schematic of circuits for sensing touch closure of active panel contacts.

Leads $RC_1$, $RC_2$, . . . ,$RC_N$ (FIG. 11) connect cyclic scan circuit 101 (e.g. an *n*-position counter-decoder) with row conductors 54*a*, 54 of upper layer(s) 39 of panel switch module(s). Scan circuit 101 is operated by pulses on line 102 generated by astable multivibrator circuit unit 103 (FIG. 11). In the absence of a STOP SCAN signal level of predetermined magnitude at 104 multivibrator 103 operates in astable free running mode to produce a continuous stream of pulses for stepping scan unit 101. With a STOP SCAN signal of predetermined level — a condition established upon sensing closure of any panel contact and persisting until shortly after the contact has been released without re-engagement — the multivibrator is disabled. Leads $RC_1$–$RC_N$ couple through inverting circuits 105 to lines designated $R_1$–$R_N$, respectively, and via these lines to touch sensing circuits of FIG. 12.

Leads $CC_1$, $CC_2$, . . . ,$CC_M$, connect with column conductors 57*a*, 57 of lower support layer(s) 43 of the panel switch module(s), and also via inverting circuits 106 with lines designated $C_1$, $C_2$, . . . ,$C_M$. Lines $CC_1$–$CC_M$ also feed OR circuit 108 having as normal output state when all panel contacts are open, level 110. When a panel contact pair is touch-closed, say at position "*jk*", and the scan pulse advances to associated row line $RC_j$ the pulse is coupled via associated column line $CC_k$ to OR circuit 108 and via amplifier 106 and associated column line $C_k$ to other sense circuits. The scan pulse coupled to OR circuit 108 drives the output of the OR circuit in the negative sense to condition 112.

When the output of OR circuit 108 switches to condition 112 multivibrator 103, which connects with output of OR 108, receives inhibit conditioning at input 104 blocking further operation of the multivibrator and thereby "freezing" states of scan unit 101 and lines RC and CC. As long as the contact position intercepted by the presently active lines $RC_j$ and $CC_k$ remains operated, the scan remains frozen in this condition. When the just mentioned contact is released, assuming that no other contact associated with $RC_j$ is concurrently operated, output of 108 returns to enabling condition 110 and the cyclic scan operation of multivibrator 103 and unit 101 is reinstated.

In scan disabling condition 112, OR 108 conditions audible tone generator unit 114 to produce a high-pitched audible tone (beep) subject to ON-OFF control factors discussed later in connection with FIG. 16. This tone persists until condition 110 is reinstated (i.e. for the duration of touch closure of a contact and contact bounce or contact release), serving both as "feedback" to authorized operators and as alarm indication to discourage unauthorized panel operation.

Figures 11A, 12:
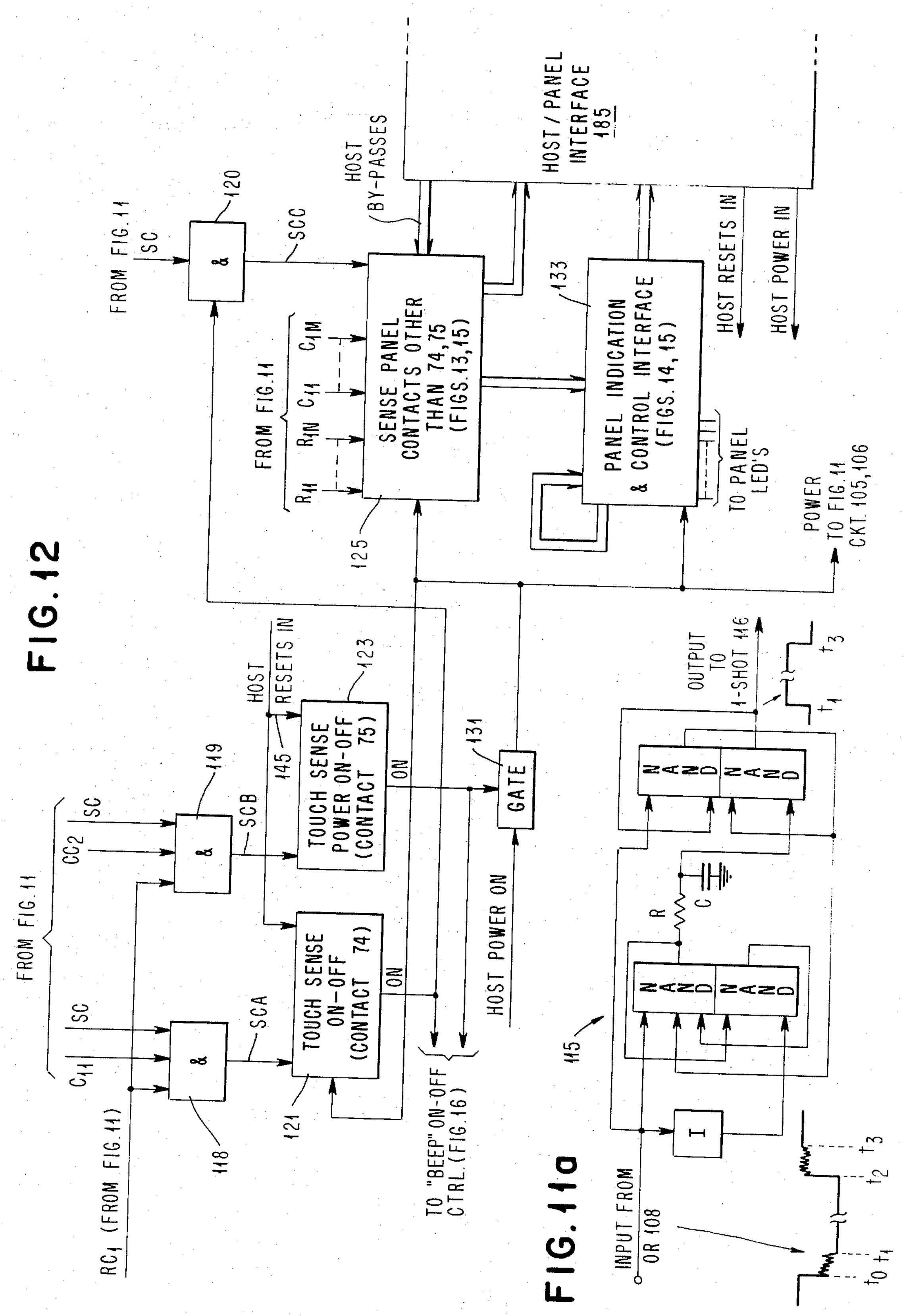
FIG. 11*a* illustrates a circuit useful as anti-bounce element 115 of FIG. 11.

Negative output transitions of OR 108, delayed by anti-bounce circuit 115, exert triggering influence upon single-shot circuit 116. Circuit 115, exemplified in FIG. 11*a*, provides pre and post bounce protection against touch bounce transient conditions preceding stable contact engagement and stable contact disengagement. The RC integration circuit in FIG. 11*a* controls triggering of one-shot 116 by its charge condition. During contact "bounce" preceding stable engagement, the transients are smoothed so that 116 is not triggered until stable discharge and contact states are attained. During contact "bounce" accompanying release of a touch point smoothed charging prevents spurious re-triggering of circuit 116 by spurious discharging input conditions. Thus after disablement of scan elements 101,103 and delays to block multiple contact closures due to contact bounce circuit 116 produces a single pulse of one-microsecond duration upon its output line 117. This pulse, termed the "sense sampling clock pulse" or simply "sense clock" (SC) partially conditions AND circuits 118, 119 and 120 (FIG. 12) which when fully conditioned provide respective touch sense sampling control outputs designated SCA (Sense Clock A), SCB (Sense Clock B) and SCC (Sense Clock C).

As indicated in FIG. 12, SCA conditions circuits 121 associated with sensing of PANEL ON-OFF contact 74 (shown in FIG. 4). SCB conditions circuits 123 associated with sensing of panel POWER ON-OFF contact 75. SCC conditions other contact sensing circuits represented by block 125.

Circuits 121 and contact 74 operate as an ON-OFF toggle which reverses condition with successive operations of contact 74. In ON condition circuits 121 supply enabling conditioning to AND 120 and ON-OFF control conditioning to tone generator 114. Conversely, in OFF condition, circuits 121 disable AND 120; effectively disabling contact sensing circuits 125 and rendering the panel touch-insensitive at all positions except in relation to sites of contacts 74 and 75.

Circuits 123 and contact 75 operate as an alternating ON-OFF toggle similar to circuits 121 and contact 74. Circuits 123 operate gate 131 to switch host power to certain panel circuits including sense circuits 125, control circuits 133, sense amplifiers 105 and 106 (FIG. 11), and sense circuits 121. This leaves host power connected only to scan and tone feedback circuits of FIG. 11 — 101, 103, 108, 115, 116, 114 —and to circuits 119, 123 associated with contact 75. Furthermore, ON-OFF conditioning of tone generator 114 (shown in FIG. 16) limits tone generation response exclusively to contact 75 when condition of circuit 123 is OFF. Thus when 123 condition is OFF, power is effectively removed from all panel functions other than those requisite to sensing of and tone response to pane contact 75.

Similarly, it will be seen that with 123 condition ON and 121 condition OFF circuits 125 are effectively disabled due to blocking of SCC transfer at AND circuit 120 (FIG. 12), and tone response of circuits 114 is restricted exclusively to operation of contacts 74 and 75. The effect of this is that all touch sensing functions of the panel not related to sensing of contacts 74 and 75 are disabled while indication power is retained. This places the panel effectively in a "standby" condition discouraging unauthorized access but retaining indications.

Contemplated variants of this arrangement include the use of groups of two or more panel contacts to provide the alternate switching functions of each of the present contacts 74,75; also the use of more sophisticated "combination lock" contact sensing operations disccused later to guard more securely against unauthorized panel access.

Lines $R_1$–$R_N$ and $C_1$–$C_M$ (FIG. 11) extend via jumpers 141 and 143 (FIG. 11) to sense circuits 125 (FIG. 12). This permits selective designation of active panel contacts as panels are assembled from standard contact grids. Alternately, the voids 49 of switch spacer layers 41 (FIG. 5) may be programmed selectively in fabrication, whereby active contacts could be determined during assembly of switch modules by selection of spacers having appropriate configurations of voids. Alternately, combinations of foregoing techniques, with or without use of varied sense circuit wiring, may be used to configure sites of active panel contacts.

Extensions of lines $R_1$–$R_N$ from logic pins (terminals) of jumpers 141 to sense circuits 125 are designated $R_{11}$–$R_{IN}$ respectively. Extensions of lines $C_1$–$C_M$ between logic pins of jumpers 143 and circuits 125 are denoted $C_{11}$–$C_{IM}$. Thus when sense amplifiers 105,106 are powered by circuit 123 various of the lines $R_{11}$–$R_{IN}$ are subject to excitation by scan signals, as are lines $C_{11}$–$C_{IM}$ when associated panel contacts are operated. Thus these lines function only when condition of power control circuits 123 is ON and appropriate source power (HOST POWER IN) is supplied. Since AND circuit 119 is conditioned by the switch conductor pair $RC_1$, $CC_2$ which directly couples to site of contact 75, and remains powered when conditioned 123 is OFF, operation of contact 75 will be sensed in this condition notwithstanding removal of power from amplifiers 105,106. Thus circuit 123 is subject to operation while in OFF condition as required to restore power to all indication and touch sensing panel circuits. Such restoration may be effected either by manual operation of contact 75 or by remote electrical control suggested by "HOST RESETS IN" connection 145 (FIG. 12).

Since AND 118 is conditioned through one of the power controlled amplifiers 106, by $C_{11}$, circuits 121 are effective only while condition of circuits 123 is ON.

Figure 13:
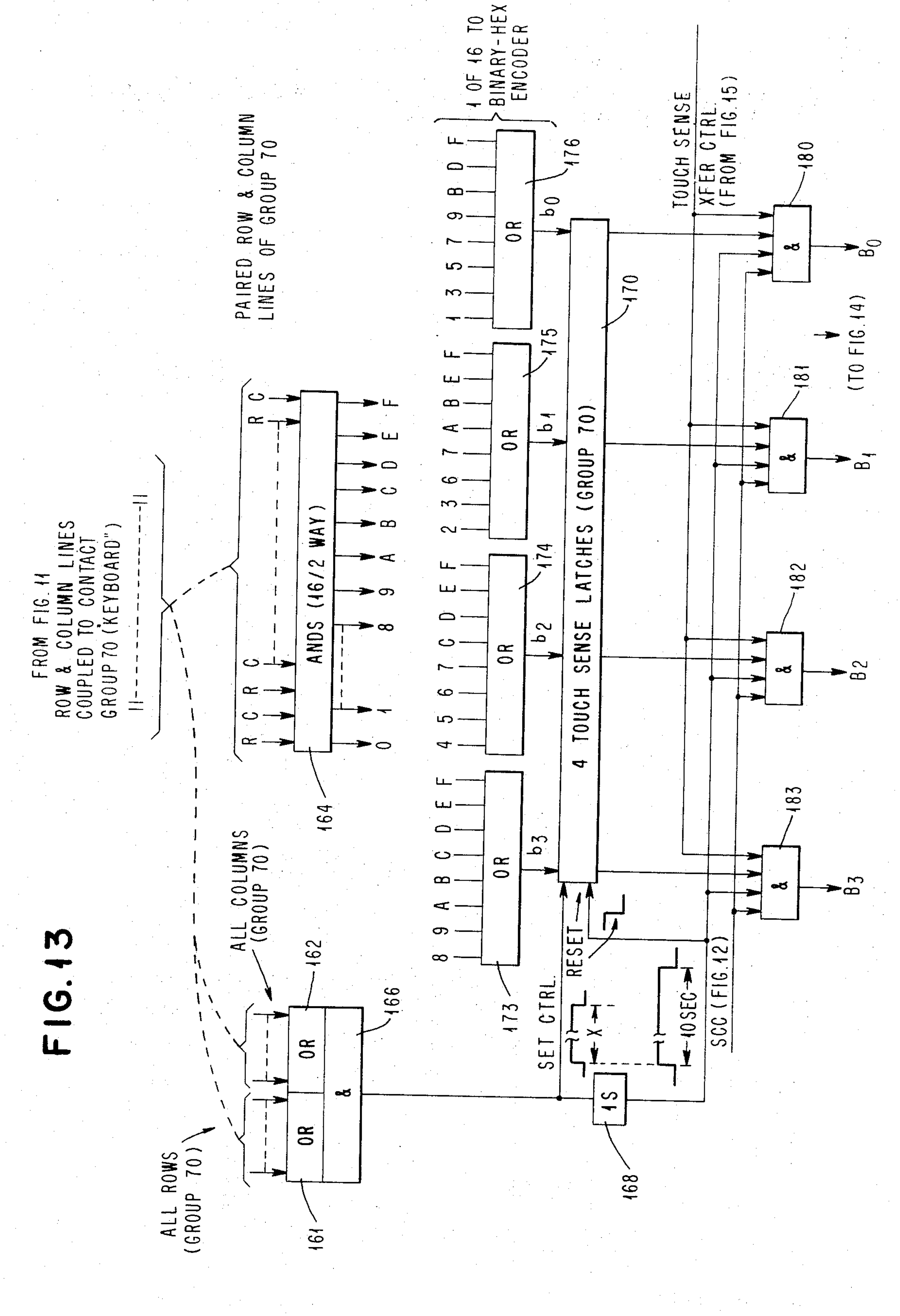
FIGS. 13–15 are schematics illustrating details of block drawn elements of FIG. 12.
Figure 15:
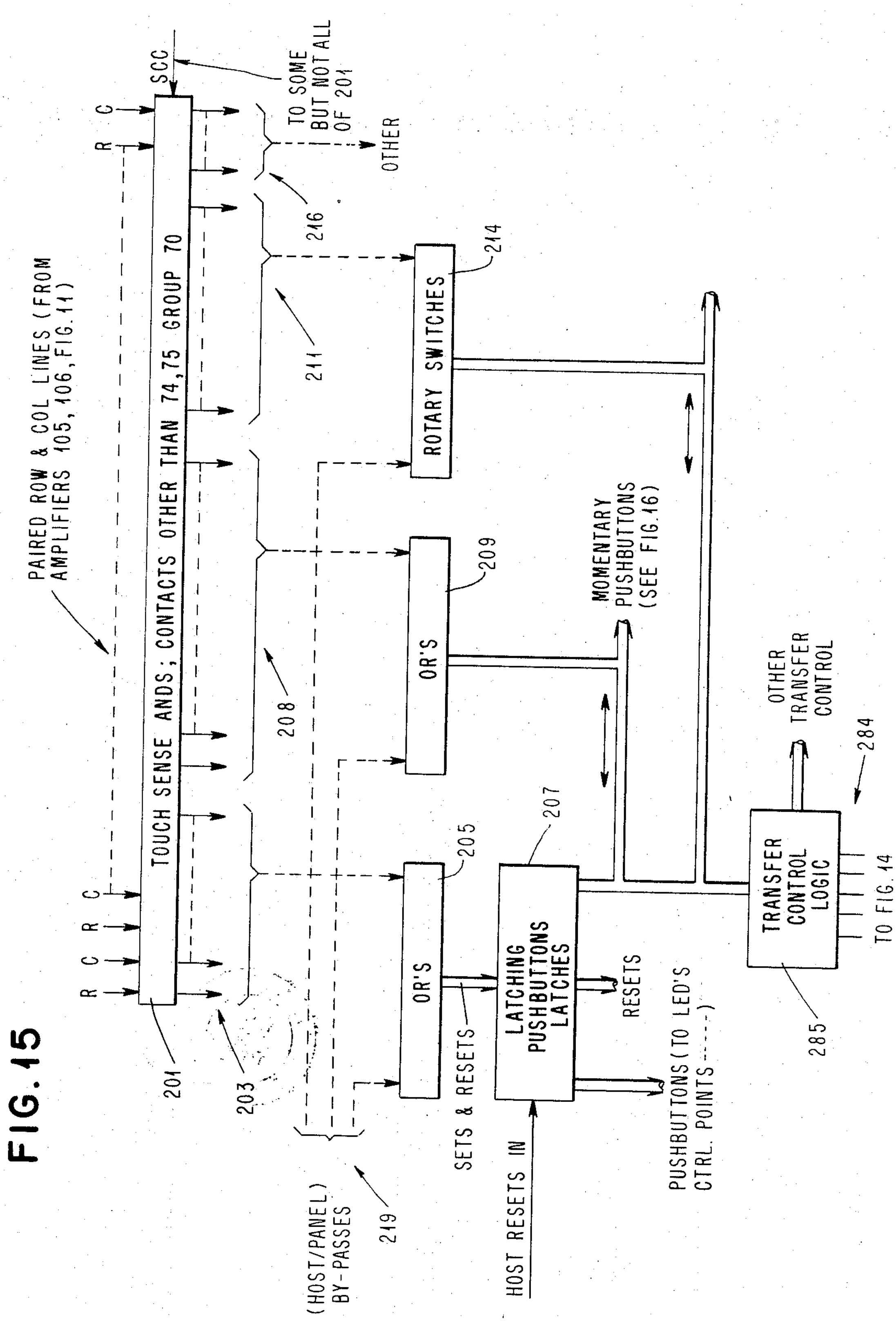

Organization of contact sensing circuits 125 is indicated in FIGS. 13 and 15. Circuits associated with Hex selection contact group 70 of FIG. 4 are shown in FIG. 13 and circuits associated with other contacts are shown in FIG. 15.

All row leads associated with panel contact group 70 extend to OR circuit 161 and all column leads of the same group extend to OR circuit 162. Row and column pairs of leads to individual contacts in group 70 are brought out in pairs to individual AND circuits 164. Since there are sixteen contacts in the group (see FIG. 4) sixteen AND circuits are provided.

AND circuit 166 conditioned by coincidence of outputs at OR circuits 161 and 162 is stimulated when and only when one of the contacts in panel contact group 70 is closed and remains stimulated so long as the same contact remains closed. Output of AND circuit 166 excites single shot circuit 168 and conditions setting controls of a group of four touch sense latches indicated generally at 170.

Outputs of the 16 AND circuits 164 are extended in groups of eight to OR circuits 173, 174, 175 and 176. Outputs of these OR circuits are coupled to setting inputs of respective latches 170. OR circuits 173–176 comprise an encoder for translating the "one of 16" output of AND's 164 when a contact in group 70 is closed into a corresponding four-bit binary digital code representation. The inputs to encoding function OR circuits 173–176 are in accordance with the following table:

| "EXCITED" INPUT | OUTPUT $b_3$ | $b_2$ | $b_1$ | $b_0$ |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| A | 1 | 0 | 1 | 0 |
| B | 1 | 0 | 1 | 1 |
| C | 1 | 1 | 0 | 0 |
| D | 1 | 1 | 0 | 1 |
| E | 1 | 1 | 1 | 0 |
| F | 1 | 1 | 1 | 1 |

Single shot 168 provides a 10-second guard pulse to AND circuits 180–183 which are conditioned by the gated sense clock pulse (SCC) and the binary coded outputs of respective latches in latch group 170. As will be shown later, the coded output $B_0$, $B_1$, $B_2$, $B_3$ of these AND circuits is transferrable via other latches and gates (FIG. 14) to the panel indicators 13B and to the host/panel interface 185 (FIG. 12). Thus, the 10-second guard pulse places a time limitation upon such transfers whereby if a contact in group 70 is operated incidental to selecting an image indication for transfer to a panel site 13B and if the control contact associated with the transfer is not operated thereafter within the required 10-second interval, the transfer cannot be completed and therefore the associated indication at site 13B cannot be altered. This serves as a safeguard against cancellation of valid indication by accidental or interrupted manipulation of a contact in group 70 in combination with a transfer control contact.

Referring to FIG. 15, row and column output leads of isolating amplifiers 105,106 (FIG. 11) are extended in pairs to multiple AND circuits 201. Outputs of these AND circuits are extended individually and in groups for further logical handling. Outputs of one such group indicated at 203 extend to respective OR circuits of a group of OR circuits generally at 205. Outputs of OR's 205 feed respective latches of a group of latches indicated at 207. These provide latching trigger effects.

Another group of outputs 208 of AND's 201 couples via OR's 209 to control lines designated Momentary Push Buttons.

Another group of outputs 211 of AND's 201 conditions logic circuits 214 providing rotary switch operations. Finally, a group of outputs 216 of AND's 201, classified as "other", associates with other touch sensing effects not properly classifiable as latching pushbutton, momentary pushbutton or rotary switch operation. A plurality of groups of leads 219 designated "by-passes" feeds OR's 205, OR's 209, switch logic circuits 214 and other not shown logic elements of the system in parallel with outputs of AND's 201. By-passes 219 extend from host/panel interface 185 (FIG. 12) and may also be extended from a predesignated one of the logic nets 214 to provide programmable touch sensing effects.

Figure 16:
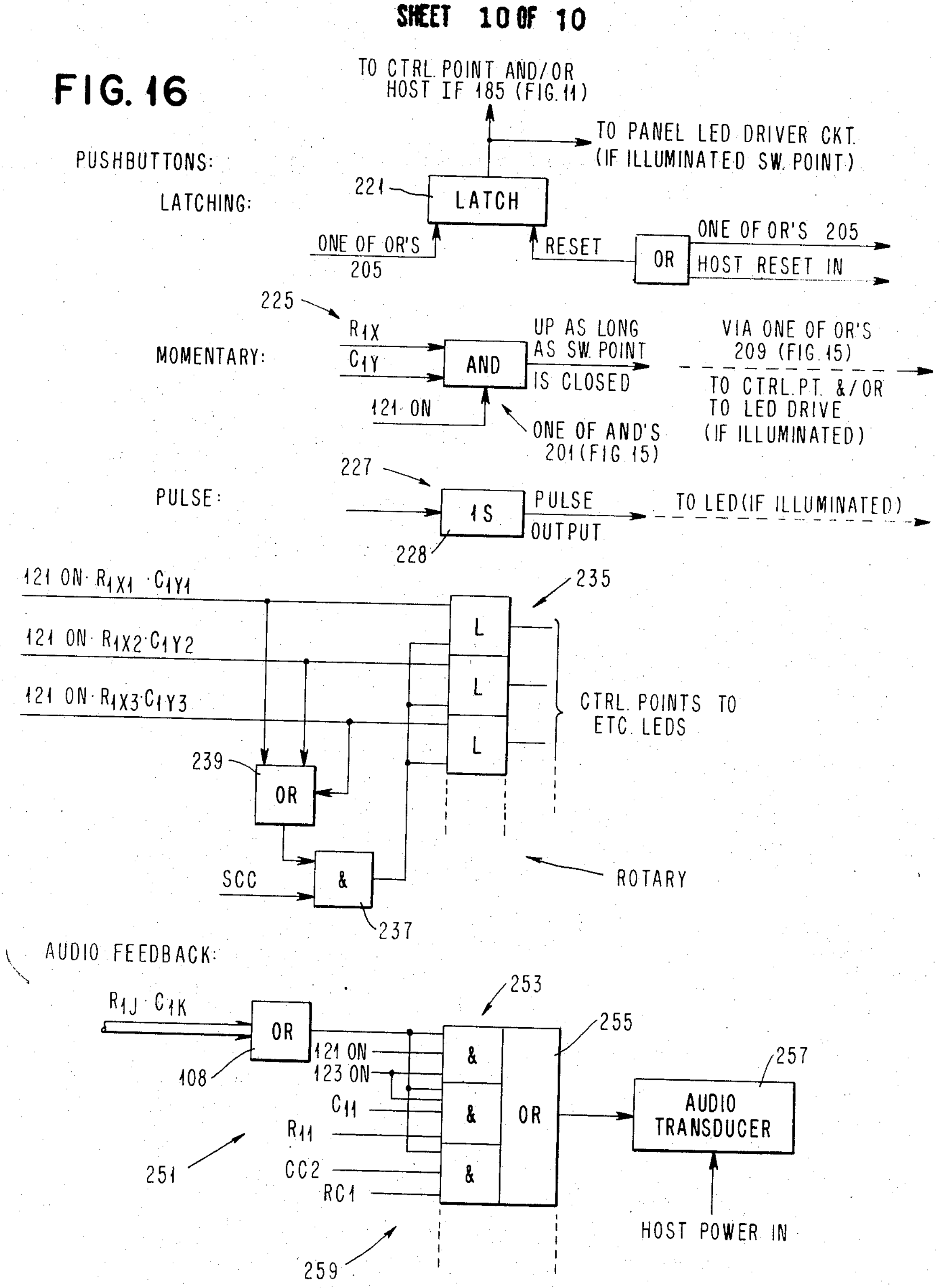
FIG. 16 illustrates basic logic circuits of various type associated as switch units or entities with panel contacts (e.g. as push-button units, toggle units, rotary switch units, etc.).

Referring to FIG. 16, circuits associated with latching and momentary type pushbuttons are indicated at 221 and 225, respectively. Since the indicated one of AND's 201 comprising the momentary pushbutton is not conditioned by SCC its output persists for the duration of switch operation. However, AND's 201 (FIG. 15) feeding OR's 205 (FIG. 15) are conditioned by SCC as suggested in FIG. 15. Since AND circuits in configurations 225 are not gated by the clock function SCC, it is necessary to condition these AND circuits 225 directly with ON condition output of circuit 121 as shown in FIG. 16, whereby all of AND's 201 are subject to disablement when circuit 121 is in OFF condition.

Pulse type push button 227 is actually a variation of the momentary configuration 225. Single shot circuit 228 receives as input the output of a momentary pushbutton configuration such as 225 having indefinite duration and produces as output a pulse of predetermined duration.

A typical rotary switch configuration as indicated at 233 (FIG. 16) comprises a group of latches 235 which are gated in concert by output of AND 237. AND 237 is conditioned by output of OR 239 and clock pulse SCC when a setting input is presented to one of the latches 235. AND 237 thereby gates all latches momentarily for the duration of SCC. Inputs of latches 235 are conditioned as shown by coincidence of ON state of panel ON-OFF control circuits 121 (FIG. 12) and excitation of line pairs $R_{1Xi}$, $C_{1uj}$ associated with respective contacts in the group comprising the rotary switch contact group. These logical coincidence functions for the inputs of latches 235 are formed by not shown AND circuits which are understood to be in the groups of AND's 201. These also are not conditioned by SCC; hence, the requirement for the condition "121 ON".

Therefore, it will be understood that inputs to latches 235 are excitable only with 121 ON coincident with operation of a contact in the associated rotary switch contact and that upon such excitation OR 239 in combination with SCC momentarily conditions AND 237 to gate all of the latches in group 235, permitting the inputs to condition the latches in the group to states which agree with the inputs.

For audio feedback control, as indicated at 251, OR 108 conditions plural AND circuits 253 having individual input association with particular panel contacts and common output association through OR 255 with audio transducer device 257. One of the AND circuits 253 conditioned by the combination of 121 ON and 123 ON excites the audio transducer when any panel contact is operated (i.e. when anti-bounce 115 is "energized"). Thus, while power control is ON and panel touch sensing control is ON, all panel contacts are active and receive active audible feedback. Another AND circuit in the group 253 responds to the combination of 123 ON, $R_{11}$ and $C_{11}$ to provide outputs to the transducer 257 when panel contact 74 is operated with panel power ON (123 ON). A third AND circuit of group 253 conditioned by $CC_2$ and $RC_1$ (see FIG. 11) evokes response from transducer 257 whenever the transducer and scan circuits 101,103 are powered (HOST POWER ON active) and contact 75 is operated, regardless of the condition of circuits 123. Other AND circuits 253 may be included to cover other conditions for selective audible response as suggested by dotted lines at 259.

INDICATION AND HOST INPUT CONTROL

Figure 14:
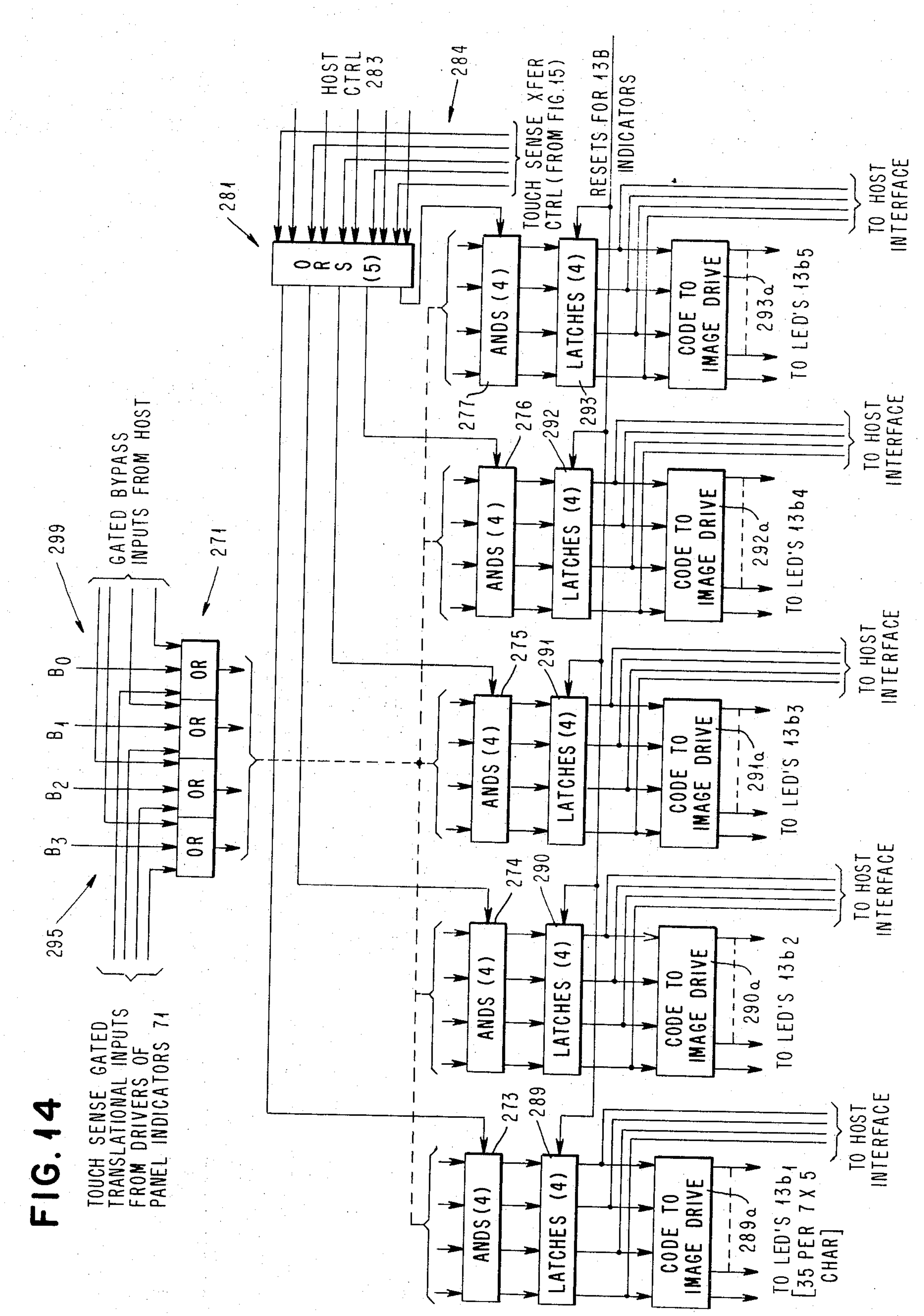

Referring now to FIGS. 4 and 12–15, especially FIGS. 4 and 14, the interaction between the panel contacts (**4*a*, 4*b*), the panel indicators 13*a*, 13*b* and the host/panel interface 185 will be understood from the following description. The hexadecimal code output of AND's 180–183 (FIG. 13) couple through respective ones of four OR circuits 271 (FIG. 14) to groups of AND circuits (five shown 273–277). Each of the groups 273–277 consists of four AND circuits receiving respective outputs of the four OR circuits 271, and associating with respective ones of the five light emissive indicator sets 13*b*. Each group of AND's 273–277 is controlled by output of a respective one of five OR circuits 281. In turn, OR's 281 receive conditioning from the host control interface via lines indicated generally at 283 and from outputs 284 of touch sense transfer control logic circuits 285 of FIG. 15**.

Circuits 285, as suggested in FIG. 15, combine various inputs representing panel contact conditions of momentary pushbottons, latched pushbuttons, toggles and rotary switches to produce requisite control functions for transferring character code selection of either contact 70 or bypass inputs through desired groups of AND's 273–277 via OR's 271. As indicated in FIG. 14 each group of AND's 273–277 conditions a respective group of four latches 289–293 as indicated in FIG. 14, and each respective group of four latches is subject to connection with either host interface 185 or with a respective group of panel indicators **13b*j* ($j$=1,2, . . . ,5) via a respective code to image conversion circuit 289*a*–293*a*. The image conversion circuits convert four bit hexadecimal code to 35 bit binary image signals capable of driving a respective 5 by 7 array of LED's (Light Emitting Diodes — FIG. 9*a***) which constitute the respective panel indicator group.

Touch sense controls 284 and host controls 283 represent alternate sources of control over transfer of intelligence to the indicators and the host interface; namely panel touch control and remote (host) control. Inputs 295 and 299 to OR's 271 are also noteworthy. Lines 295 are connectable with latches in 207, 214 (FIG. 15) to enable receipt of intelligence displayed in binary indicators 71 (FIG. 4) and lines 299 are subject to "bypass" connection with sources of information in the host system. Thus, operations previously mentioned of translating coded indications at indicating areas 71 of the panel into character image indications at selected aperture sites **13*b* of the panel may be carried out through appropriate conditioning of lines 295 and 284**.

Bypass routes represented by by-passes 219 (FIG. 15) and lines 299 of FIG. 14 represents means enabling the host/system to exert virtually complete control over all panel indications and touch derivable control functions independently of the contact elements of the panel switch grid. The utility of this feature, although perhaps immediately appreciated by those skilled in the art deserves special mention. It permits the host to establish virtually any panel indication state instantaneously by program control. It also permits the host to establish by remote program control virtually any touch sensation control state instantaneously (noting in contrast that these functions are limited to sequential implementation when derived thru panel contact operations since the panel contacts are invariably sequentially scanned).

Indicator driver and host interface connections to outputs of conversion circuits **289*a*–293*a* and latch groups 289–293 respectively are subject to not-shown control by outputs of latch elements of groups 207, 214 (FIG. 15**).

Plural Touch Interactive Operations a. Hex code indications are translatable to character image indications: It will also be understood from previous discussions that coded indications in sub-groups of four lights within the larger group 71 (FIG. 4) are translatable, by combinations of operations of panel contacts designating the source sub-group and panel contacts designating the "destination" indicator group (**13*b*1, 13*b*2, . . . ,) into character image indications at 13*b*1, 13*b*2, . . . .**

b. Contact operations are translatable combinationally to character image indications: From the foregoing it will be understood that operations of panel contacts in combinations, for instance a contact in group 70 and one in group 72 (FIG. 4), are useful to condition circuits 273–277, 289–293 and **289*a*–293*a* (all FIG. 14**) to provide various control and indication states. It will be understood also that through host bypasses indication states are controllable "remotely" or by combinations of remote and manually originated touch conditioning.

c. Alphanumeric indications field definition: In respect to the indication translations and contact translations above, it is convenient to arrange one of the rotary contact sets such as 72 to establish variable field definition control restricting access to certain indicator groups **13*b*1–13*b*5. Thus, in one state of the rotary contact group 72, a not-shown counter may be operated to direct hex code function inputs to OR's 271 (FIG. 14) to successive ones of the five translational networks 289*a*–293*a*. In another state of contact group 72 these code functions may be directed to the first three positions 289*a*–291*a* (13*b*1–13*b*3) with further entries rejected or ring shifted within the sub-group of 289*a*–291*a*.** Thus the panel operator in preparing ordered digital information for transfer to the host system may preset the positional order range of the intelligence.

When the host system includes a computer and addressable store and the information registered in the latch groups 289–294 represents numbers of varied significance (e.g. storage addressed, storage data, etc) this feature conveniently permits positioning of the significant digits by a simple "rotary switch" selection.

d. Combination effects (touch positions, time, etc.)

Those skilled in the touch control arts will immediately appreciate that by virtue of the versatile organization of bypass and direct controls described above, one may achieve numerous interactive control and privacy securing effects by conditioning of particular operations upon appropriate combinations, sequences and relative timing of transferral conditions 219 (FIG. 15), 283, 284 (FIG. 14). An example of one possibility in this respect would be to condition control of POWER ON-OFF circuits such as 123 and/or sense ON-OFF circuits such as 121 (FIG. 12) upon a combination lock type of logic dependent upon operations of panel contacts in particular sequence. For additional privacy (security) time conditions may be applied similar to the 10-second guard function of circuit 168 (FIG. 13). Another expedient would be to add a required host bypass condition to the enabling combination. Required modifications of circuits 118 and 119 in FIG. 12 for this purpose are considered obvious to one skilled in the art given the control functions and circuit capability indicated in FIGS. 13–15.

MISCELLANEOUS FUNCTIONS

Other functions and operations available by straightforward adaptation of the versatile panel system just described will readily occur to those skilled in the art.

CONCLUSION

The foregoing touch sensitive indicating panel construction and control system is characterized by versatility derived through the modular construction and through incorporation of the various control and bypass functions associated with elements 121, 123 of FIG. 12, elements 283, 284, 295 and 299 of FIG. 14 and elements 219 of FIG. 15.

While the invention has been particularly shown and described with reference to a preferred embodiment thereof, it will be understood by those skilled in the art that various changes in form and detail may be made therein without departing from the spirit and scope of the invention.

Accordingly, I claim:

1. In a touch sensitive indicating panel containing an integral covering overlay membrane useful for transmitting touch pressure to a plurality of touch sensitive switches, the improvement comprising:

a pattern of predominantly opaque artwork incorporated in said overlay to designate: a plurality of interspersed and interassociative touch sensing sites and light spot indicating sites; said indicating sites comprising a first plurality of single spot indicating sites discretely offset from said touch sensing sites and a second plurality of multi-spot character image indicating sites discretely offset and distinguished from both said touch sites and said first plurality of indicating sites; said indicating sites consisting of discrete areas subject to light transmission formed by transparent elements in said artwork;

a modular assembly of touch sensitive elastic switches comprising conductors retained on transparent eleastic support films separated by a transparent spacer film having voids at switch sites; said switch sites aligned with centers of respective said touch sites of said overlay; and modular means mounted for electrical sensing association with said touch switches and for light spot indicating association with said overlay indicating sites; said means including first means for detecting and interpreting touch contact conditions of said switches, second means for producting discrete single spot light indications directed towards respective said single spot indicating sites of said overlay and third means for producing multi-spot character image light indications directed towards respective said multi-spot indicating sites of said overlay.

2. In an improved touch sensitive indicating panel according to claim 1 the further improvement of a narrow band light filter incorporated in the material of said overlay at least at said indicating sites; with said second and third means adapted to produce light spots having spectral characteristics predominantly contained within said narrow band.

3. In an improved touch sensitive indicating panel according to claim 1, the further improvement of a gloss treated covering surface in said overlay useful to reduce specular reflection.

4. In an improved touch sensitive indicating panel according to claim 1, the further improvement wherein said switch assembly comprises:

perpendicular arrays of interfacing conductors supported on said films separated by said transparent spacer film, pairs of perpendicular said conductors on respective said support films hving paired elastic extension segments offset from the position at which the conductors cross; said paired segments being parallel to each other and aligned with centers of respective said voids in said spacing film; each said pair of segments thereby forming a switch subject to elastic contact engagement through said respective spacer void in response to touch pressure transferred through a respective said touch site of said overlay.

5. In an improved touch sensitive indicating panel according to claim 4, the further improvement of:

a transparent stress easing film interposed between said switch assembly and overlay; said stress easing film having voids located at predetermined positions relative to said voids in said spacer film to ease mechanical stresses on the individual segments of said pairs of extension segments at edges of said voids in said spacer film.

6. An improved touch sensitive indicating panel according to claim 4 wherein said switch assembly further comprises:

conductive connection between opposite ends of each said extension segment and the respective said array conductor providing alternate conduction paths useful to maintain electrical touch sensing continuity in the event of physical severance of the respective extension segment.

7. An improved touch sensitive indicating panel according to claim 4 wherein said switch assembly comprises extensions of said perpendicular conductors, said support films and spacing film forming a flexible bus connectible with said modular means.

8. In an improved touch sensitive indicating panel according to claim 7, the further improvement wherein said modular means comprises:

means for supplying scan pulses sequentially to successive conductors on one of said support films;

means for sensing transferral of said scan pulse to conductors on the other one of said support films conditional upon existence of touch contact engagement between segments of a said extension segment pair; latch means associated with said sensing means for retaining toggle indications associated with sensing operations of said sensing means; and means associated with said latch means for conditioning operations of said sensing means in respect to certain of said extension segment pairs upon conditions preserved in said latch means in respect to prior operations of other segment pairs.

9. A panel according to claim 8 wherein said latch means preserve conditions reserved for control of power conditioning of at least a portion of said sensing means and for control of touch sense response of said sense means to all but one of said extension segment pairs, and wherein said sensing means is responsive to said one segment pair to reverse said touch sense control condition of said latch means.

10. In an improved touch sensitive indicating panel according to claim 7, the further improvement wherein said moudlar means is connectible through multichannel interfacing circuit means with host equipment; said interfacing means including:

means for sensing sequential operations of particular said offset contact segment pairs in predetermined combinational groupings; and means responsive to said sensing means for controlling said second means to produce multi-spot light indicating effects at selected said second indicating sites and control and input effects relative to selected channels of said interfacing means.

11. In an improved touch sensitive indicating panel according to claim 10, the further improvement wherein said interfacing means includes:

bypass control means capable of operating independently of said sensing means to control said means responsive to said sensing means.

12. In a touch sensitive indicating panel in combination:

a touch transmissive elastic overlay membrane formed out of transparent material containing a covering pattern of opaque artwork surrounding isolated areas of transparency designated as indicating sites; said artwork including contrasting patterns of nomenclature and design functionally designating said indicating sites and also designating positions and functional associations of a plurality of discrete touch sensitive sites coincident with selected intersection points of a predetermined grid;

a switch module mounted behind said overlay;

said module comprising a grid network of perpendicular conductor arrays supported on transparent elastic films separated by a spacing film, the latter film having voids registered centrally with respective said touch sensitive overlay sites; said conductors having paired parallel extension segments subject to elastic contact engagement through said voids, said segments being offset relative to crossing intersections of respective conductors and extending across centers of respective said voids, said segment pairs thereby being normally spaced apart by said spacing film and subject to flexed displacement into contact in reaction to touch pressure applied to respective said touch sensitive sites of said overlay;

means for producing light spot indications transmissible through spaces between said conductors in said switch module to said overlay indicating sites; and modularly constructed printed circuit means mounted for electrical association with said switch module and overlay to provide coupling connections for electrical sensing of said switch module and for selective energization of said light spot producing means.

13. A touch sensitive indicating panel in accordance with claim 12, in which said indicating sites of said overlay membrane comprise a plurality of first indicating sites reserved for transmission of discrete single spot binary indications and a plurality of second indicating sites reserved for transmission of multiple spot indications forming character images of numbers, letters and/or the like; and in which said modularly constructed printed circuit means comprises:

printed circuits;

means for holding a first plurality of single light spot sources individually aligned with respective said first indicating sites of said overlay and subject to receiving selective electrical excitation to produce respective said single spot indications; and means for holding a second plurality of discretely spaced multi-spot light generating units, each unit including a group of associatively arrayed light spot sources aligned with a respective second indicating site of said overlay, individual sources of said group being subject to selective excitation to provide said character image indications at respective said second indicating sites.

14. A panel assembly according to claim 13, wherein plural groups of said touch sensitive sites of said overlay are distinguished as groups by said artwork and respective contact segment pairs of said switch module associated with said sites are sensed in corresponding groups; said assembly further including:

means coupled to said printed circuits of said modularly constructed means for sensing sequential touch contact engagements of paired contact extension segments associated with plural said touch site groups in predetermined position/time combinations; and means responsive to said combination sensing means for producing complex indication and control effects relative to said second indicating sites of said overlay and said multi-spot light generating units associated therewith.

15. A touch sensitive indicating panel in accordance with claim 12 including means associated with said modularly constructed means for sensing sequenced touch engagements of plural said offset extension segment pairs of said switch module and for providing associated plural touch dependent control and indicating effects relative to said multi-spot generating means.

16. A panel according to claim 15, including bypass means coupled to said sensing and effect providing means for enabling certain said effects to be produced alternately in response to a single control signal from said bypass means and in response to sensing touch operations of a plurality of said offset segment pairs in a predetermined sequence.

17. A touch sensitive indicating panel according to claim 12 wherein said conductors in said arrays of said switch module have redundant connections with said extension segments serving to provide alternate conduction paths useful to sustain continuity for contact sensing when a said segment of a pair is physically broken.

18. A panel according to claim 12 including a transparent stress easing touch transmissive film interposed between the overlay and switch module; said easing film containing voids aligned centrally with edges of said spacing film voids and with corresponding portions of respective said contact segment pairs subject to receiving shearing stresses at said edges.

19. A panel according to claim 13 including a grid frame structure interposed between said printed circuits and switch module; said structure having discrete compartments respectively sheltering individual said single light spot sources and individual said multi-spot light generating units; and operating as an assembly alignment structure to provide tolerance positional adjustment of said single sources relative to respective first indicating sites of said overlay.

20. A panel according to claim 19 including a transparent stiffener sheet located between said grid frame and switch module for preventing physical contact between said sheltered light spot sources and switch module and for supplying touch backing support for said switch module.

21. A panel according to claim 13 in which said light spot sources are microminiature light emitting diodes which emit light in a narrow portion of the visible spectrum and said overlay includes a light filtering layer with passband matched closely to the spectrum of said diode emissions, said filtering layer serving to attenuate extraneous background light of broader spectral content.

22. A panel according to claim 12 wherein said switch module includes, as integral extensions of said conductor arrays and support films, a flexible bus assembly capable of extending to and connecting with said modularly constructed means to complete therewith signal conduction paths for touch sensing.

23. In a touch sensitive indicating panel, including a touch transmissive elastic overlay membrane serving as a medium for transmitting touch pressure to elastic switch elements covered by the overlay and for receiving and transferring light indications of predetermined spectral characteristics through spaces between said switch elements, an improved overlay membrane comprising:

a bonded laminate of at least three film layers, including at least one interior layer formed of light transmissive elastic material retained between exterior layers formed of light transmissive elastic material; said at least one interior layer containing a surface coating of opaque artwork covering a major portion of its surface exclusive of a plurality of discrete single spot and multi-spot indicating sites; said artwork functionally designating said indicating sites and a plurality of discrete touch sensing sites; said indicating sites and touch sites being relatively interspersed; at least one of said exterior layers having a light transmission characteristic confined to a narrow portion of the visible spectrum associated with a spectral emission characteristic of a particular light indication source used with said overlay; at least one of said exterior layers being gloss treated to reduce specular reflection; at least one of said exterior layers having selectively located exterior coatings coincident with said single-spot indicating sites productive of rear projection screen spot illumination effects.

24. An improved overlay membrane in accordance with claim 23 in which:

said at least one interior layer is a film of polyvinyl chloride having uniform and predetermined thickness, and said exterior layers are polyester films of uniform and predetermined thickness, and said films are adhesively bonded together to form said laminate.

25. In a touch sensitive indicating panel providing interspersed light indication sites and touch sensing sites, and containing a covering elastic overlay membrane which is useful to transfer touch contact pressure to plural contact elements of an elastic switch module and to transfer viewable light indications from sources positioned behind and between said contact elements, an improved elastic switch module comprising:

first and second arrays of parallel conductors, conductors of said second array oriented perpendicular to conductors of said first array;

first and second light transmissive elastic support films retaining respective said conductor arrays in inwardly facing position in said perpendicular orientation; and a light transmissive spacing film positioned between said support films; said spacing film having voids associated with but discretely offset from positions of crossover of respective pairs of conductors in said first and second arrays; said voids centrally aligned with discrete touch sensing sites of said overlay designated and outlined by artwork on said overlay;

individual conductors of said arrays having plural elastic extension segments aligned with centers of respective said spacing film voids; said extension segments interfacing in pairs to form switch contact elements of said switch module; the paired segments of each contact element being disposed in parallel to each other for enhanced contact engagement.

26. In a touch sensitive indicating panel an improved elastic switch module comprising:

first and second conductor arrays separated by a spacing film having voids centered at touch sensing positions intercepted by discrete pairs of relatively perpendicular conductors in said first and second arrays; and a stress reducing film covering said module; said stress reducing film having voids centrally aligned with edges of said spacing film voids at positions of shearing stress contact with said conductors.

27. In a touch sensitive indicating panel providing multiple interspersed touch sensing sites and light spot indicating sites at the surface of a single flat elastic overlay membrane backed by a grid configuration of modularly associated elastic touch contact elements the improvement comprising:

means for conditioning said contact elements with electrical scanning pulses applied to said elements in a predetermined scanning sequence;

means common to all of said contact elements for detecting touch operation of any of said conditioned elements;

means coupled to said common detecting means for producing a sense sampling pulse of a predetermined short duration in response to a detected touch operation of comparatively long duration;

plural conditionally operable positionally oriented sensing circuits coupled to individual said contact elements for sensing and providing indications of touch operations thereof;

means for applying said sampling pulses to said positionally oriented sensing circuits; and means selectively responsive to operations of certain less than all of said positionally oriented sensing circuits in response to said scanning pulses to condition said sampling pulse applying means to apply said scanning pulses alternately to all of said sensing circuits and to only said certain sensing circuits.

28. A panel according to claim 27 wherein said certain sensing circuits are associated with at least one contact element designated for control of delivery of panel power to touch sensing and indication elements and at least one other contact element designated for control of enablement and disablement of panel touch sensitivity only.

29. In a panel according to claim 27:

scan control means coupled to said common detecting means conditionable to disable said scan conditioning means and halt said scan sequence upon initial detection of any touch operation thereby establishing a statically sensible electrical condition in the touch operated contact element, said control means reactivating said scan sequence upon release of the touched contact.

30. In a panel according to claim 29:

means coupled to said scan control means conditionable to provide a perceptible feedback indication for the duration of touch operation of each touched contact element.

31. A panel according to claim 30 wherein said feedback indication is a distinct audible tone.

32. In a touch sensitive indicating panel having interspersed light spot indicating sites and touch sensing sites located at the surface of an integral elastic overlay membrane and a multi-channel interface for connection to host apparatus the improvement comprising:

means responsive to momentary touch operations of individual said touch sensitive sites to provide staticized electrical signal indications representative thereof;

means responsive to predetermined combinations of momentary touch operations of particular said touch sensitive sites sensed in combination with associated said representative staticized signal indications derived from previously applied touch operations to provide a control signal for each said combination of particular significance in respect to said combination; and means responsive to said control signals to produce light spot indications at various said indicating sites and control and input effects relative to selected channels of said host interface.

33. In a panel according to claim 32:

bypass means coupled to said control signal responsive means for supplying control signals independently of said combination responsive means, said bypass means linked with said host apparatus.

34. In a touch sensitive indicating panel in combination:

an elastic overlay membrane formed of transparent material and having a plurality of interspersed light spot indicating sites and touch sensing sites on a surface thereof; said sites distinguished by opaque artwork coatings; said overlay surface gloss treated to reduce specular reflection; said indicating sites comprising first and second sites of distinct outline; said first sites reserved for single spot on-off indication and said second sites reserved for multi-spot character image indication; said overlay material including a narrow band filtering characteristic for selective transmission of light in a portion of the visible spectrum; said first sites having rear projection screen coatings;

a printed circuit module mounted in parallel with said overlay;

a plurality of light spot emissive devices mounted on said module and facing said overlay; single said devices aligned with respective said first indicating sites and groups of multiple said devices aligned with said second sites; said devices being excitable to emit light energy predominantly confined to said portion of said visible spectrum;

a supportive grid structure between said printed circuit module and overlay having openings for sheltering said light emissive devices;

an elastic switch module interposed between said overlay and supportive grid structure; said switch module comprising upper and lower transparent elastic support films containing respective relatively perpendicular arrays of parallel conductors positioned so as not to interfere with passage of light from said emissive devices to said overlay; paired perpendicular conductors of said arrays having elastic extension segments paired as contacts at crossing positions of the respective conductors; said segments of each pair being offset from respective crossing positions of respective conductors and extending parallel to each other; said segments being aligned with said overlay touch sensing sites; said arrays being separated by a transparent spacer film having multiple voids centrally aligned with respective said paired offset segments;

said switch module being supported by a transparent stiffener sheet interposed between the grid structure and switch module;

stresses on said switch module being eased by a flexible stress easing film interposed between the overlay and the switch module;

said printed circuit module backed by a foam backing sheet and an electrical noise shield;

said switch module having an integral flexible bus extension connecting with the printed circuit module for conveying conditioning signals to the switch module and touch sensing signals from operated contacts of the switch module.

35. The combination of claim 34 together with first circuit means coupled to said switch module via said printed circuit module for providing input conditioning signals to one segment of each of said paired contact segments in a predetermined cyclic sequence;

second circuit means coupled to said switch module for detecting transferral of said conditioning signal to the other segment of any said contact pair when said any contact pair is operated to closed position by touch pressure transferred through said overlay;

third circuit means coupled to said switch module and second means for sensing the particular contact pair transferring said conditioning signal;

fourth circuit means coupled to particular outputs of said third circuit means for conditionally disabling and enabling a part of said third circuit means whereby only contact pairs of a particular subset of all pairs can be sensed by said third circuit means is disabled condition and all pairs can be sensed in enabled condition;

fifth circuit means coupled to said third circuit means for producing control and indication effects relative to said emissive devices; and sixth circuit means coupled to said fifth circuit means for providing control inputs to said fifth means bypassing said fourth means, and thereby providing alternate control of said effects.

36. The combination of touch sensitive indicating panel elements in accordance with claim 35 wherein said second circuit means includes antibounce circuit means providing pre and post protection against spurious detection of said conditioning signal transferral.

* * * * *